(12) United States Patent
Buitkamp et al.

(10) Patent No.: US 6,175,106 B1
(45) Date of Patent: Jan. 16, 2001

(54) LIGHT GRID AND METHOD OF ITS MANUFACTURE

(75) Inventors: Hermann Buitkamp, Freiburg; Heinrich Hippenmeyer, Freiamt, both of (DE)

(73) Assignee: Sick AG, Waldkirch (DE)

( * ) Notice: Under 35 U.S.C. 154(b), the term of this patent shall be extended for 0 days.

(21) Appl. No.: 09/047,905

(22) Filed: Mar. 25, 1998

(30) Foreign Application Priority Data

Mar. 26, 1997 (DE) .............................................. 197 12 828

(51) Int. Cl.⁷ ..................................................... H01J 40/14
(52) U.S. Cl. ........................................... 250/221; 250/216
(58) Field of Search ................................ 250/221, 222.1, 250/216, 214 AL; 340/555–557; 356/375, 379, 384

(56) References Cited

U.S. PATENT DOCUMENTS

| 3,805,061 | 4/1974 | De Missimy . |
| 4,015,122 | 3/1977 | Rubinstein . |
| 5,567,931 | * 10/1996 | Amend et al. ....................... 250/221 |

FOREIGN PATENT DOCUMENTS

| 43 12 947 C1 | 6/1994 | (DE) . |
| 43 04 343 A1 | 8/1994 | (DE) . |
| 44 38 798 C2 | 2/1997 | (DE) . |
| 0 060 021 A2 | 9/1982 | (EP) . |

OTHER PUBLICATIONS

Veldkamp, Wilfrid B., et al.: "Binäre Optik", *Spektrum der Wissenschaft*, Jul. 1992, pp. 44–50.

* cited by examiner

*Primary Examiner*—Que T. Le
(74) *Attorney, Agent, or Firm*—Townsend and Townsend and Crew LLP

(57) ABSTRACT

An optical arrangement is described having a plurality of light transmitting transmitter elements and/or receiver elements, a plurality of diffractive/refractive optical elements and a transparent front cover, in particular a front plate. The diffractive/refractive optical elements are arranged on a uniform carrier element formed in one piece. The carrier element is formed by the front cover, with the diffractive/refractive optical elements being directly formed in the front cover, and in particular being pressed into or moulded into the latter. The transmitter elements and/or the receiver elements are arranged on a uniform circuit board formed in one piece. Furthermore a light grid is described having such optical arrangements, and also a method for the manufacture of the required components for such optical arrangements.

43 Claims, 4 Drawing Sheets

LIGHT GRID AND METHOD OF ITS MANUFACTURE

FIELD OF THE INVENTION

The invention relates to an optical arrangement comprising a plurality of light transmitting transmitter elements and/or receiver elements formed for the reception of light, a plurality of diffractive/refractive optical elements and a transparent front cover, in particular a front plate. Furthermore, the invention is directed to a light grid having at least one optical arrangement with transmitter elements and also at least one optical arrangement with receiver elements of this kind, and also to a method of manufacturing the individual elements of corresponding optical arrangements.

DESCRIPTION OF THE PRIOR ART

Optical arrangements of this kind, i.e. transmitter and receiver apparatus, and also light grids formed from them are, for example, used with automatically closing doors, such as lift doors. In earlier times, only one respective transmitter and receiver element was provided at the sides of the door opening. Nowadays, a plurality of transmitter and receiver elements are increasingly arranged at the door opening and are distributed over the height of the door opening for safety reasons. The aim is to achieve a situation in which both narrow articles, which enter into the detection zone disposed within the door frame, such as for example sticks, fingers or dogleads, and also articles which enter the doorway over the whole region of the height of the door, can be reliably recognised.

In order to be able to produce a light grid which is ideally matched to the height of a particular door or doorway it is necessary, having regard to the large number of different heights of the different doors, to keep a large number of different pieces of optical transmitter and receiver apparatus in store, or these apparatuses must be individually manufactured for each door. This leads, on the one hand, to high storage costs and, on the other hand, to high production costs, because the production of light grids having a plurality of different heights reduces the numbers manufactured for each particular height, and thus practically equates to individual manufacture.

OBJECT OF THE INVENTION

The present invention is based on the object of designing a light grid of the initially named kind, and also the optical transmitter and receiver apparatuses required for the light grid, so that a very simple and cost-favourable manufacture of these components is possible and, at the same time, so that the light grids which are produced can be variably used for almost any desired height of a monitored zone. Furthermore, a method should be set forth for the simple and cost-favourable manufacture of the individual elements required for a light grid formed in accordance with the invention.

The object of the invention relating to the apparatus is satisfied in that the diffractive/refractive optical elements are arranged on a uniform carrier element formed in one piece; in that the carrier element is formed by the front cover and the diffractive/refractive optical elements are directly formed in the front cover, and are in particular pressed into the latter, or moulded into the latter, and in that the transmitter and receiver elements are arranged on a uniform circuit board formed in one piece.

A light grid designed in accordance with the invention comprises at least one of these optical transmitter and receiver apparatuses.

The part of the object relating to the method is solved by the features of claims 29 to 43.

BRIEF DESCRIPTION OF THE INVENTION

Thus, in accordance with the invention, the important components of the optical light grid, namely the diffractive/refractive optical elements, and also the circuit board(s) which carry(carries) the transmitter and/or receiver elements are formed in the ideal length required from elements manufactured as "goods by the metre" by simple measurement and cutting. With this arrangement, a further reduction of the number of elements that are required, and thus a further cost reduction, is achieved by the formation of the diffractive/refractive optical elements directly in the front cover. In addition, a situation is made possible in this way in which the diffractive/refractive optical elements which originally represented separate individual parts can be prepared as "goods by the metre".

A further advantage of combining the front cover and the diffractive/refractive optical elements into a uniform component lies in the fact that a separate lens manufacture can be omitted and the optical elements can, for example, be formed by pressing the non-treated transparent front cover in a continuous process and can thus be manufactured economically with constant quality in an "endless process".

In practise the circuit board can also be automatically equipped with the electronic components in a continuous process, whereby the quality of the automatic mounting of these components can be increased. In addition, no connections are necessary between individual circuit boards, for example via plug connections or soldered connections, whereby the problems which are often associated with this problem are likewise avoided.

The testing of the so equipped circuit boards can also be carried out directly after the mounting of the components in the same method step, whereby the costs can be further reduced and the quality can simultaneously by increased. The cutting off of the individual element sections can take place by cutting, by fracture, by sawing or the like, depending on the materials used.

In accordance with an advantageous embodiment of the invention a plurality of diaphragm apertures is provided between the circuit board carrying the transmitter and/or the receiver elements and the front plate forming the diffractive/refractive optical elements, with the diaphragm apertures being formed in a uniform diaphragm plate, preferably in one piece. This diaphragm plate can be manufactured in accordance with the manufacture of the circuit board or of the front cover in an endless method, so that when manufacturing a light grid of the desired length, it is only necessary to cut off a corresponding section of the prepared diaphragm plate material. Through the diaphragm plate the scattering between adjacent transmitting and/or receiving elements is reduced, whereby the response accuracy of the light grid is enhanced.

The centre-to-centre spacings of two adjacent diffractive/refractive optical elements, of two adjacent transmitter elements, of two adjacent receiver elements and optionally of two adjacent diaphragm apertures are of substantially the same size. Through this arrangement, and also through the one-piece design of the front cover, and also of the circuit board and of the diaphragm plate, it is ensured, through simple adjustment of the front cover carrying the diffractive/refractive optical elements with respect to the respective circuit board, and optionally with respect to the diaphragm plate, that all transmitter and receiver elements are aligned in a single process with all the diffractive/refractive optical elements and also optionally with all the diaphragm apertures. An adjustment of the position of individual elements is thus not required.

The sizes of the diaphragm apertures are advantageously variably adjustable, whereby a stepless adaptability to different customer wishes can be achieved.

In accordance with a further advantageous embodiment of the invention, the circuit board and/or the front cover and/or the diaphragm plate are flexible, and are in particular each formed as a flexible foil. In this manner, the light grid can be tailored very individually to have any desired shape, so that it can, for example, be adapted to extend along a predetermined curvature. Furthermore, the manufacture of flexible front covers with integrated diffractive/refractive optical elements and the manufacture of flexible circuit boards or diaphragm plates can be produced in a "reelto-reel" process. In this way, the premanufactured base materials are unwound, are passed to respective devices suitable for the pressing in of the diffractive/refractive elements, for the mounting of the transmitter and/or receiver elements, or for producing the diaphragm apertures, and the intermediate products prepared in this manner can be reeled up again onto a further supply reel. For the manufacture of a light grid of desired size, the desired length of the respective intermediate products can then be unwound from the supply reel and can be cut off from the remaining material located on the reel.

The circuit board and/or the front cover and/or the diaphragm plate can in each case be so flexibly designed that they can be bent in a direction defined by the optical axes of the transmitter and/or receiver elements and/or in a direction perpendicular thereto, or in any desired direction.

While flexibility in the direction of the optical axes can be achieved by a suitable, thin, flexible material, lateral flexibility, i.e. a flexibility perpendicular or oblique to the optical axes, can for example be achieved by forming wedge-shaped lateral cut-outs in the regions between the lenses or the diaphragm apertures, or between the transmitter elements and/or the receiver elements, with the cut-outs being in particular made open to the lateral margins of the circuit board and/or of the front cover and/or of the diaphragm plate.

In accordance with a further preferred embodiment of the invention the front cover and the circuit board, and also optionally the diaphragm plate, are non-displaceably arranged relative to one another, and in particular connected to one another. In this respect, the connection, when considered over the length of the individual elements, can take place at individual points or over the full length of the components. When the circuit board, the front cover, and optionally also the diaphragm plate are of flexible design, then they are preferably arranged in a common housing, in particular a housing of rigid design. In this manner, the connection of the flexible elements takes place through the common housing which endows the transmitter and/or receiver strips forming the light grid with the required stability at the same time.

In accordance with a further advantageous embodiment of the invention, the housing is formed as a rail of U-shaped section, in particular as an extruded section, and guide sections, in particular guide strips, for the introduction and holding of the front cover, and also optionally further guide sections, in particular further guide strips, for the introduction and holding of the diaphragm plate, are formed in particular at the inner sides of the limbs of the U-shaped rail. The circuit board can be advantageously arranged directly at the base of the U-shaped rail section and can in particular be connected to the base of the U-shaped rail section. The mounting of both the circuit board and also of the front cover or of the diaphragm plate to the housing can, for example, take place by adhesive bonding, screwing or flanging.

A plurality of tubes, in particular tubes connected together, is advantageously provided between the circuit board carrying the transmitter and/or receiver elements and the front plate forming the diffractive/refractive optical elements. Lateral radiation of light can be prevented by the tubes provided at the transmitter side, whereas laterally incident scattered light is absorbed by the tubes at the receiver side.

The tubes preferably form an intermediate element, in particular a flexible intermediate element, which comprises a chain-like row of individual tubes. In this respect, the chain-like intermediate element can be flexibly designed both substantially in the direction of the optical axes of the transmitter and/or receiver elements and/or in the direction substantially perpendicular to the optical axes of the transmitter and/or receiver elements and/or in any desired direction, so that the total arrangement consisting of the front cover, the intermediate element and the circuit board has a high flexibility.

In accordance with a further advantageous embodiment, the intermediate element comprises two separate units in the longitudinal direction, with these units being connected to one another to form the intermediate element. The intermediate element can basically also consist of more than two units if this brings further advantages, for example from a technical manufacturing viewpoint. The units can also be adhesively bonded to one another, welded, or connected to one another in any other desired manner, or can, for example, be held together by the front cover, the circuit board or the housing. By way of example, the outer edges of the units can be engaged over by projections formed at the margins of the front cover.

The intermediate element can be prepared as "goods by the metre" in the same way as the front plate, the circuit board or the diaphragm plate, so that a transmitter or receiver element with the desired length can be produced by cutting off a corresponding section.

Further advantageous embodiments of the invention are set forth in the subordinate claims.

Diffractive and/or refractive optical elements can basically be produced in the following manner by way of example. In a basic foil or basic plate consisting for example of plastic, strip-like cylindrical lenses, in particular Fresnel cylindrical lenses, are first formed extending parallel to one another, and in particular directly adjacent to one another.

The line-like recesses required for the lenses can, for example, be produced by guiding a laser beam with an in particular triangular or diamond-shaped cross-section along parallel lines, so that the material of the base foil of the plate is melted and vaporised at the surface along the lines along which the laser beam is guided. At the positions of greater cross-section of the laser beam, more energy acts on the material as the beams sweeps over it, so that more material is melted at these points and the cut-outs which thereby result have a greater depth. Thus, in this manner, a plurality of parallel groove-like cut-outs can be formed which have a substantially triangular cross-section perpendicular to the surface of the basic foil or of the basic plate.

A plurality of first sections of any desired length are then separated, for example cut off, from the basic foils or basic plates with strip-like optical elements produced in this or another manner, with each first section consisting of a single strip-like element. In addition, second, strip-like sections are cut off from the basic foils or plates, in a direction perpendicular to the longitudinal axes of the strip-like optical elements, and have a width which is the same as the width of the strip-like optical elements. One first and one second section are then subsequently placed together, and in particular fixed together, so that the longitudinal axes of the groove-like cut-outs of the first and second section each lie vertically above one another, whereby a plurality of adjacent collecting lenses are produced.

In this manner, practically endless strips or strips of a specific length of a plurality of optical elements arranged in series can be produced. Typical thicknesses of the basic foil or basic plate that is used can lie between 50 and 300 $\mu$m, in particular around ca. 175 $\mu$m. The depth of the groove-like cut-outs produced can, for example, amount to between 3 and 50 $\mu$m, in particular to around 10 $\mu$m. The described strips can be used in an optical arrangement in accordance with the claims 1 to 27, or in a light grid in accordance with claim 28, and can also be used in a method in accordance with the claims 29 to 43. They can, however, also be used independently of this in other applications.

BRIEF LISTING OF THE FIGURES

The invention will now be described in the following with reference to an embodiment and to the drawings in which are shown.

DESCRIPTION OF THE PREFERRED EMBODIMENTS

Figure 1:
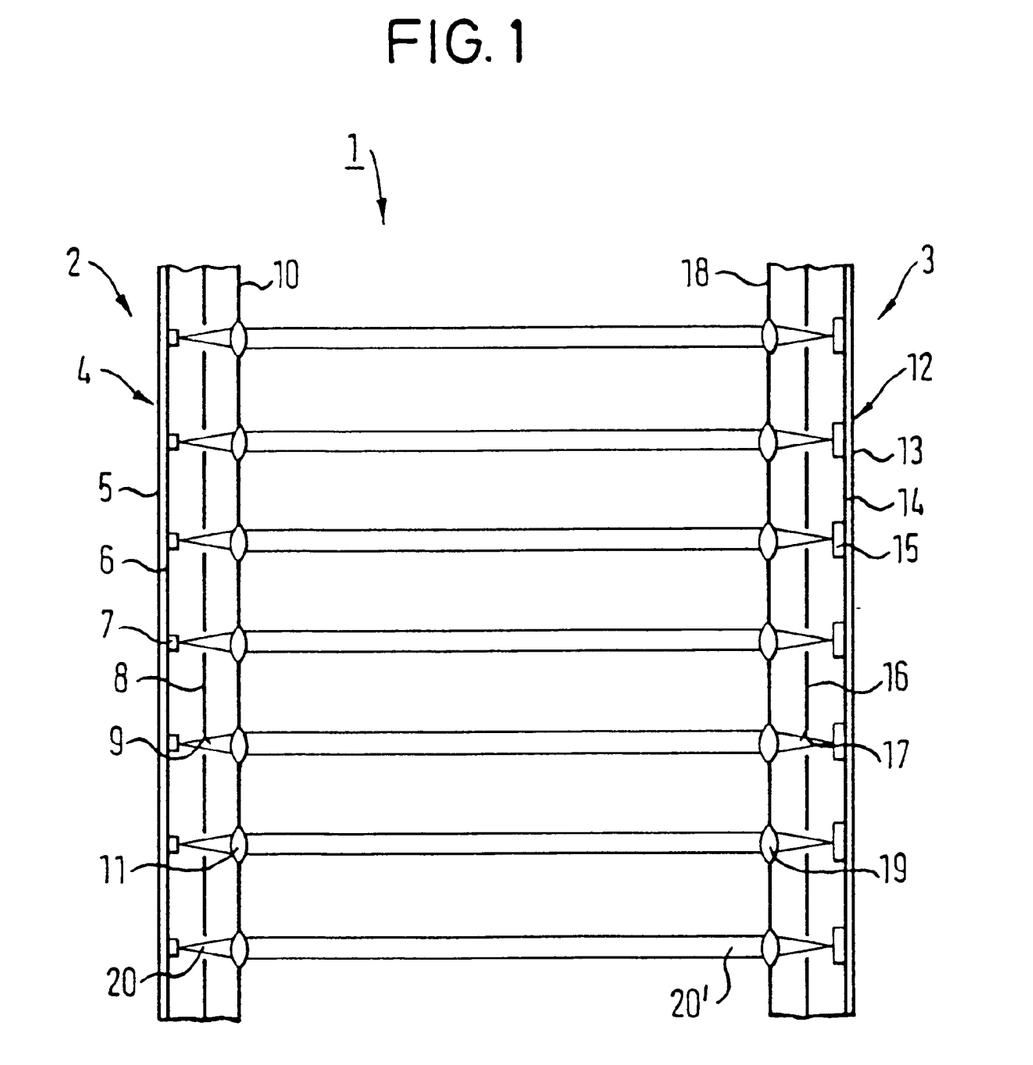
FIG. 1 a schematic cross-section through a light grid formed in accordance with the invention, FIG. 2 a schematic plan view of a front cover formed in accordance with the invention, FIG. 3 a cross-section through a transmitter strip of a light grid formed in accordance with the invention, FIG. 4 a perspective representation of a further embodiment of the invention, FIG. 5 a schematic representation of an apparatus for the manufacture in accordance with the invention of a flexible front cover with diffractive/refractive optical elements, and FIG. 6 a schematic representation of an apparatus for the manufacture in accordance with the invention of a flexible circuit board formed in accordance with the invention.

In FIG. 1 there is shown a light grid 1 which includes a transmitter strip 2 and a receiver strip 3.

The transmitter strip 2 has a strip-like housing 4 of which only the rear wall of the housing 5 can be seen in the longitudinal section shown in FIG. 1. In the interior of the housing 4 a circuit board 6 is arranged in the region of the rear wall of the housing and transmitter elements 7 are secured to the circuit board and connected up electrically.

In the centre of the housing 4 there is provided a diaphragm plate 8 which is provided with diaphragm apertures 9 at equidistant intervals, with the centre-to-centre spacings between adjacent diaphragm apertures 9 being the same as the centre-to-centre spacings between adjacent transmitter elements 7.

At the side of the housing 4 opposite to the rear wall of the housing 5 there is provided a transparent front cover 10 in which schematically illustrated diffractive/refractive optical elements 11 are formed at equidistant intervals.

The receiver strip 3 arranged opposite to the transmitter strip 2 includes a strip-like housing 12 of which only the housing rear wall 13 is shown in the longitudinal section shown in FIG. 1.

A circuit board 14 is arranged in the region of the housing rear wall 13 and receiver elements 15 are secured to the circuit board at equidistant intervals and connected up electrically.

At the centre of the housing 12 there is arranged a diaphragm plate 16 in which diaphragm apertures 17 are provided at equidistant intervals. The centre-to-centre spacings between the diaphragm apertures 17 are substantially identical to the centre-to-centre spacings of the receiver elements 15.

At the side of the receiver strip 3 opposite to the rear wall 13 of the housing there is provided a transparent front cover 18 in which schematically illustrated diffractive/refractive optical elements 19 are formed at equidistant intervals.

The transmitter elements 7 produce light beams 20 which are radiated through the diaphragm apertures 9 and projected in bundled form via the diffractive /refractive optical elements 11 of the transmitter strip 2 onto the diffractive/refractive optical elements 19 of the receiver strip 3. The received light beams 21 are then projected by these optical elements through the diaphragm apertures 17 onto the receiver elements 15.

Figure 2:
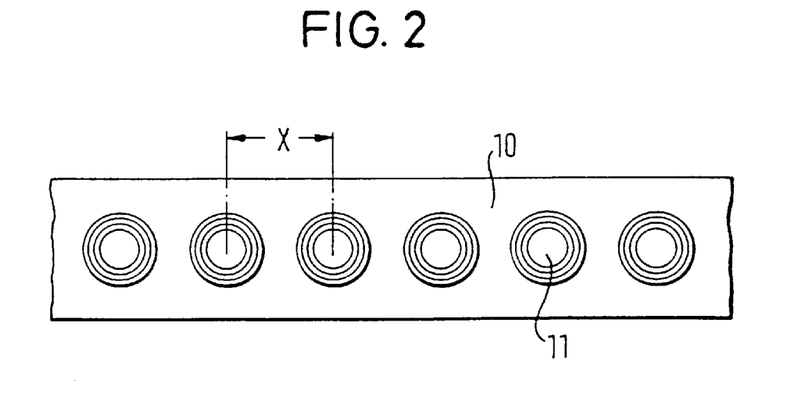

The strip-like layout of the transparent front cover 10 can be recognised from FIG. 2. A plurality of diffractive/refractive optical elements 11 is formed in series in the transparent front cover 10 along its longitudinal axis. In this arrangement the centre-to-centre spacings X of two adjacently disposed diffractive/refractive optical elements 11 determines the resolution of the light grid 1 (see FIG. 1).

Figure 3:
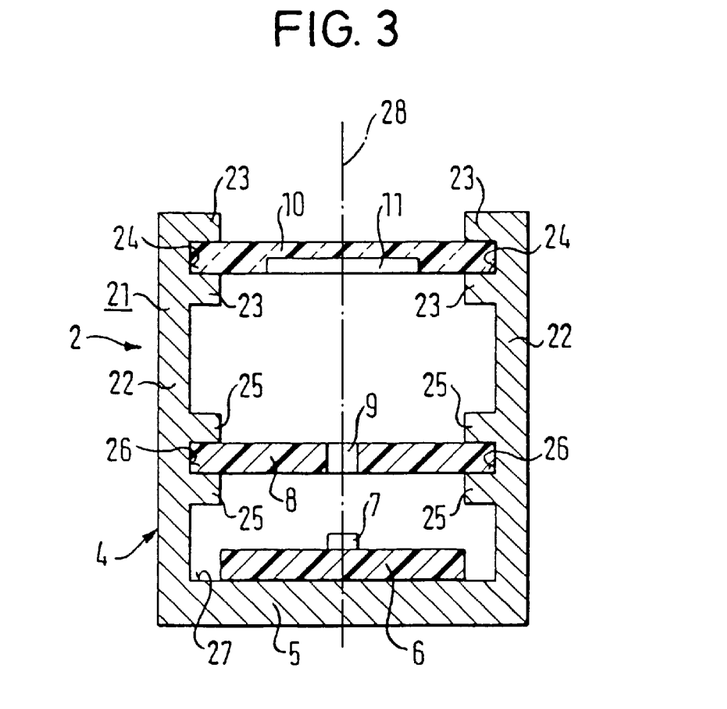

The layout of the housing 4 as a U-shaped rail section 21 can be recognised from FIG. 3. The U-shaped rail section 21 has two limbs 22 which each stand at a right angle to the housing rear wall 5 forming the base of the U-shaped rail section 21.

Guide strips 23 formed as projections are provided at the inner sides of the limbs 22 in the region of their free ends, with a guide groove 24 in each case being formed between the guide strips 23 and having a width which corresponds approximately to the thickness of the front cover 10.

The front cover 10 is arranged with its lateral sides in the guide grooves 24 and is pushed into these, for example in the direction perpendicular to the plane at the drawing.

In similar manner, two guide strips 25 are in each case formed at the inner sides of the limbs 22 in the central region of the U-shaped rail section and respectively form a guide groove 26 between them. The diaphragm plate 8 is pushed into these guide grooves 26, so that its lateral sides at least substantially fully fill out the guide grooves 26.

The circuit board 6 is provided at the inner sides of the housing rear wall 5 forming the base 27 of the U-shaped rail section 21 and is, for example, adhesively bonded to the latter. The circuit board 6, the diaphragm plate 8 and the front cover 10 are so aligned in this arrangement in the U-shaped rail section 21 that the axes of symmetry 28 of the diffractive/refractive optical elements 11 of the diaphragm apertures 9 and of the transmitter elements 7 arranged on the circuit board 6 are aligned with one another.

The front cover 10 and the diaphragm plate 8 can, for example, be secured by adhesive bonding against displacement within the guide grooves 24 or 26 respectively. Furthermore, boundary elements can be provided at the ends of the transmitter strip 3, for example in the form of cover caps, which prevent a longitudinal shift of the front cover 10 and of the diaphragm plate 8. In this manner it is ensured that the diffractive/refractive optical elements, diaphragm apertures and transmitter elements cannot be mutually displaced in operation once they have been adjusted relative to one another.

The receiver strip 3 is designed analogously to the transmitter strip 2 shown in FIG. 3, with only the transmitter element 7 being replaced by corresponding receiver elements 15.

Figure 4:
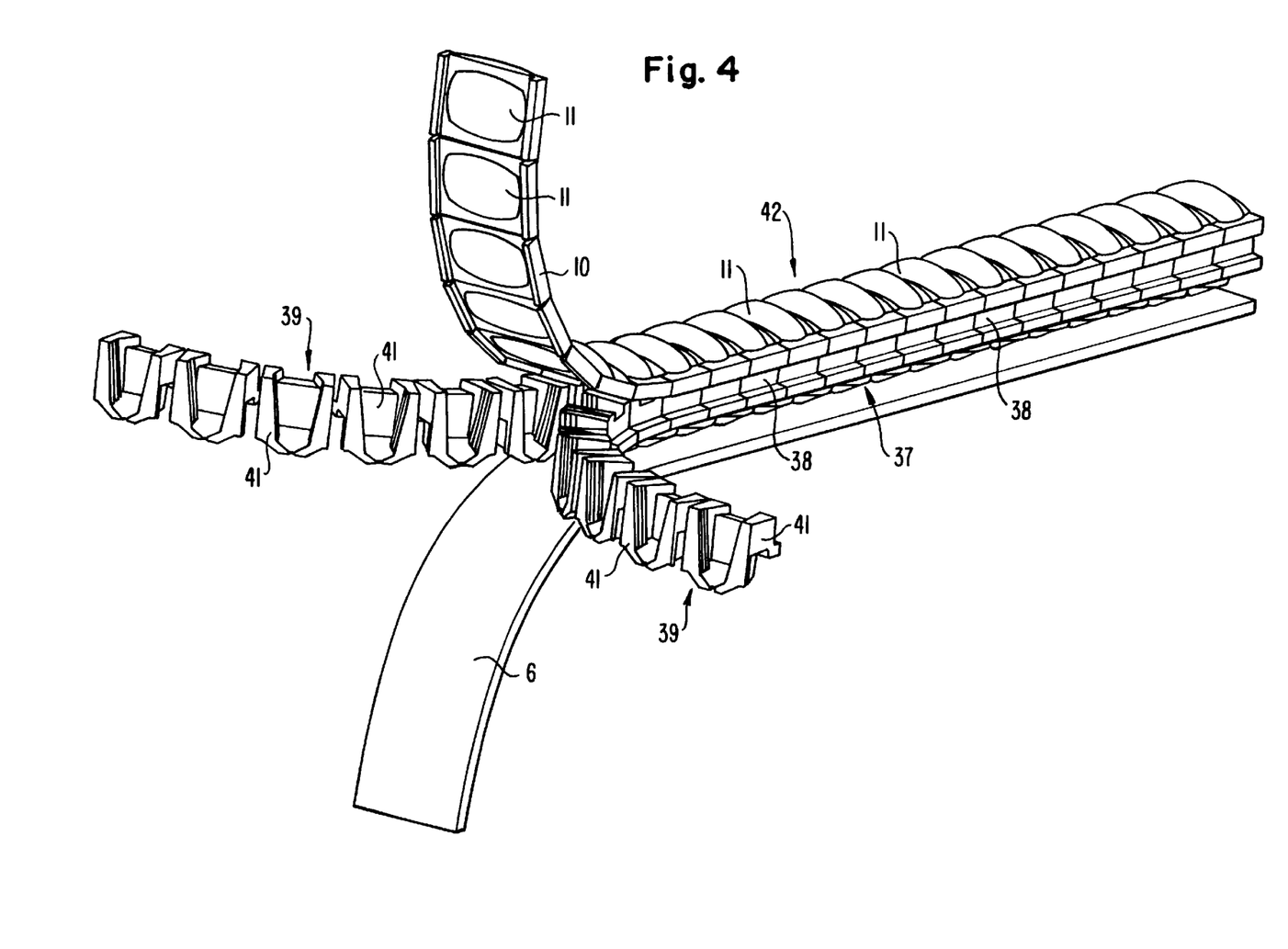

In FIG. 4 there is shown an embodiment of a transmitter strip 42 in which a chain-like intermediate element 37, which consists of a plurality of tubes 38, is arranged between the front cover 10 and the circuit board 6 instead of a diaphragm plate 8.

The intermediate element 37 is split along its longitudinal axis and consists of two mirror-symmetrically designed units 39, which respectively form a row of tube halves 41 and which are, for example, manufactured in the injection moulding process. By assembling the front cover 10, units 39 and circuit board 6 in the manner indicated in FIG. 4, a transmitter strip 42 of any desired length formed in accordance with the invention can be produced very simply. In analogous manner, a receiver strip in accordance with the invention can also include an intermediate element 37 and be produced in similar manner to the transmitter strip 42.

Figure 5:
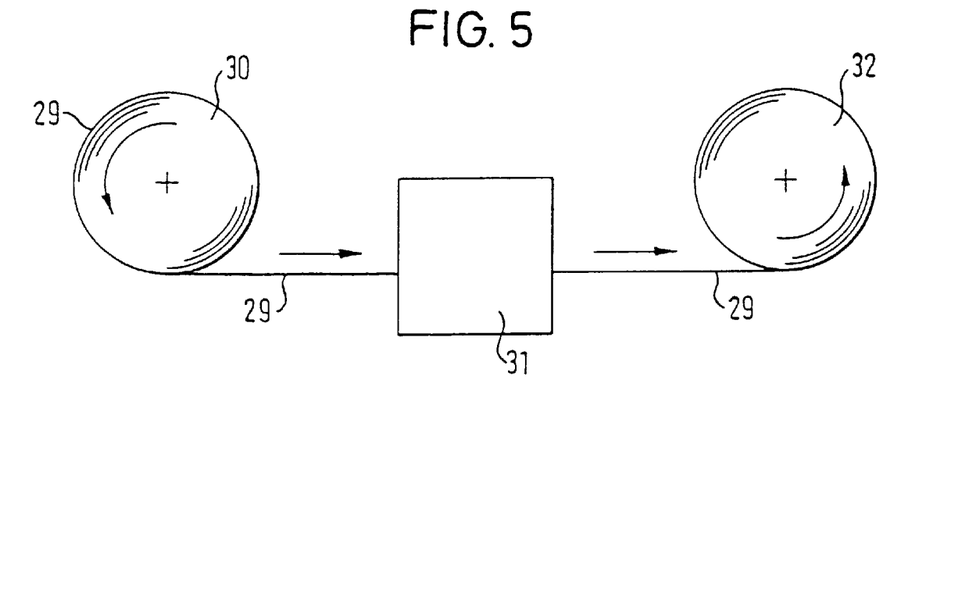

In the apparatus schematically illustrated in FIG. 5 for the production of flexible front covers with integrated diffractive/refractive optical elements, a strip-like transparent material 29 which is to be used for the formation of the transparent front cover, and which has a length which normally amounts to a multiple of the length of the front cover to be produced, is wound onto a first reel 30. For the formation of the diffractive/refractive optical elements the transparent material 29 is unwound from the reel 30 and supplied to a hot coining device 31 (hot pressing device).

In this device diffractive/refractive optical elements are continuously pressed into the transparent material 29 and the treated transparent material 29 is subsequently supplied to a second reel 32 and wound onto the latter.

After the transparent material has been fully unwound from the first reel 30, provided with diffractive/refractive optical elements by the hot coining device 31 and subsequently fully wound onto the second reel 32, a corresponding length of transparent material 29 can be unwound from the second reel 32 and separated from it, for example cut off or sawn off, for the production of front covers.

Figure 6:
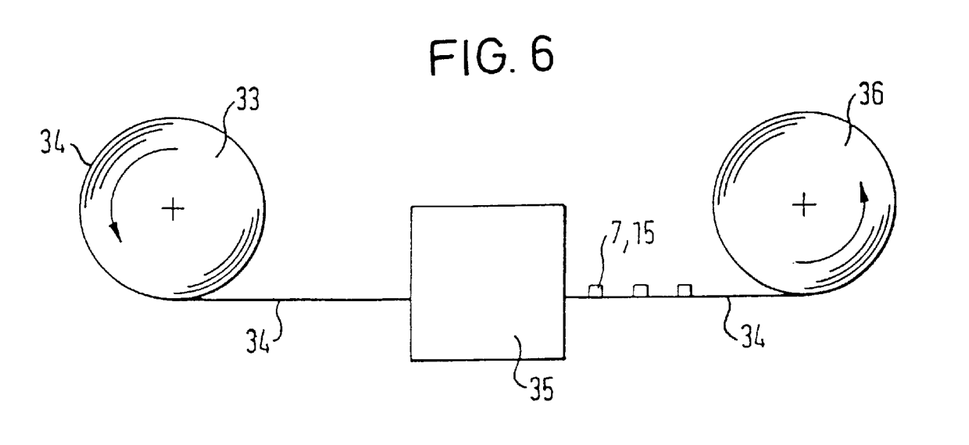

The apparatus shown in FIG. 6 for the manufacture, in accordance with the invention, of circuit boards and the attached components, functions analogously to the apparatus described in accordance with FIG. 5. A strip-like circuit board material 34 is wound up onto a first reel 33 and has a length which normally amounts to a multiple of the length of the circuit boards to be produced. The circuit board material 34 is continuously unwound from the first reel 33 and passed to an automatic component fitting unit 35, with which the circuit board material 34 can be equipped with the transmitter elements and/or receiver elements 7, 15. Directly after the mounting of these elements a functional test can be carried out by a non-shown automatic testing unit following the automatic mounting unit.

The circuit board material 34 equipped with the transmitter and/or receiver elements 7, 15 is guided to a second reel 36 and wound up onto the latter until the entire length of the circuit board material 34 has been equipped with transmitter and/or receiver elements 7, 15.

For the manufacture of a circuit board having a specific length, a corresponding piece or length of the equipped circuit board material 34 is unwound from the second reel 36 and cut off.

The front covers or circuit boards produced in accordance with the description of the FIGS. 5 and 6 can then, for example, be introduced into a U-shaped rail section 21 in accordance with FIG. 3 and/or provided with an intermediate element 37 in accordance with FIG. 4, so that transmitter and receiver strips 2, 3, 42 in accordance with the invention can be formed.

The aperture plate 8 can be manufactured analogously to the method described in accordance with FIGS. 5 and 6. Instead of the hot coining device or the automatic component mounting unit, there is in this case simply an apparatus for the formation of diaphragm apertures, for example a punch device.

Basically, it is not necessary to fit out all the mounting locations provided on the circuit boards 6, 14 with transmitter and/or receiver elements 7, 14. For example, only every second mounting location can be equipped, so that by corresponding setting of the automatic mounting unit, light grids of different resolutions can be produced. The spacing of the diffractive/refractive optical elements integrated into the front cover can then remain unchanged, so that in this manner, only one type of front cover has to be kept available to produce different light grids.

What is claimed is:

1. Optical arrangement comprising a plurality of transmitter elements (7) which transmit light and/or receiver elements (15), a plurality of diffractive/refractive optical elements (11) and a transparent front cover (10), in particular a front plate, characterised in that the diffractive/refractive optical elements (11) are arranged on a uniform carrier element formed in one piece; in that the carrier element is formed by the front cover (10) and the diffractive/refractive optical elements (11) are directly formed in the front cover (10), and are in particular pressed into the latter, or moulded into the latter, and in that the transmitter and receiver elements (7, 15) are arranged on a uniform circuit board (6) formed in one piece.

2. Optical arrangement in accordance with claim 1, characterised in that a plurality of diaphragm apertures (9, 17) is provided between the circuit board (6, 14) carrying the transmitter and receiver elements (7, 15) and the front plate (10, 18) forming the diffractive/refractive optical elements (11, 19), with the diaphragm apertures being formed in a uniform diaphragm plate (8, 16) of one piece construction.

3. Optical arrangement in accordance with claim 1, characterised in that the circuit board (6, 14) and/or the front cover (10, 18) and/or the diaphragm plate (8, 16) are of flexible design and are in particular each formed as a flexible foil.

4. Optical arrangement in accordance with claim 1, characterised in that the front cover (10, 16) is formed of plastic, for example of plexiglass.

5. Optical arrangement in accordance with claim 1, characterised in that the circuit board (6, 14) and/or the front cover (10, 18) and/or the diaphragm plate (8, 16) are of strip-like design.

6. Optical arrangement in accordance with claim 1, characterised in that the diffractive/refractive optical elements (11, 19) are formed as Fresnel lenses.

7. Optical arrangement in accordance with claim 1, characterised in that the centre-to-centre spacing of two adjacent diffractive/refractive optical elements (11, 19) is substantially the same as the centre-to-centre spacing (X) of two adjacent transmitter elements (7).

8. Optical arrangement in accordance with claim 1, characterised in that the centre-to-centre spacings of two adjacent diffractive/refractive optical elements (11, 19) is substantially the same as the centre-to-centre spacings of two adjacent receiver elements (15).

9. Optical arrangement in accordance with claim 2, characterised in that the centre-to-centre spacings of two adjacent diffractive/refractive optical elements (11, 19) is substantially the same as the centre-to-centre spacings of two adjacent diaphragm apertures (9, 17).

10. Optical arrangement in accordance with claim 2, characterised in that the sizes of the diaphragm apertures (9, 17) are variably adjustable.

11. Optical arrangement in accordance with claim 1, characterised in that the front cover (10, 18) and the circuit board (6, 14) and also, optionally, the aperture plate (8, 16) are non-displaceably arranged relative to one another, and are in particular connected to one another.

12. Optical arrangement in accordance with claim 1, characterised in that the front cover (10, 18) and the circuit board (6, 14) and also, if necessary, the diaphragm plate (8, 16) are arranged in a common housing (4, 12), which is in particular of rigid design.

13. Optical arrangement in accordance with claim 12, characterised in that the housing (4, 12) is formed as a U-shaped rail section (21), in particular as an extruded section.

14. Optical arrangement in accordance with claim 13, characterised in that guide sections, in particular guide strips (23), for the introduction and holding of the front cover (10, 18) and optionally also further guide sections, in particular further guide strips (25) for the introduction and holding of the aperture plate (8, 16), are formed in the U-shaped rail section, in particular at the inner sides of the limbs (22) of the U-shaped rail section (21).

15. Optical arrangement in accordance with claim 13, characterised in that the circuit board (6, 14) is arranged at the base (27) of the U-shaped rail section (21) and is in particular secured to the base.

16. Optical arrangement in accordance with claim 1, characterised in that the number of the transmitter elements (7) is smaller than or the same as the number of the diffractive/refractive optical elements (11).

17. Optical arrangement in accordance with claim 1, characterised in that the number of the receiving elements (15) is smaller than or the same as the number of the diffractive/refractive optical elements (11).

18. Optical arrangement in accordance with claim 2, characterised in that the number of the diaphragm apertures (9, 17) is smaller than or the same as the number of the diffractive/refractive optical elements (11).

19. Optical arrangement in accordance with claim 3, characterised in that the circuit board (6, 14) and/or the front cover (10, 18) and/or the diaphragm plate (8, 16) are of flexible design substantially in the direction of the optical axes of the transmitter and/or receiver elements (7, 15) and/or in a direction substantially perpendicular to the optical axes of the transmitter and/or receiver elements (7, 15) and/or in any desired direction.

20. Optical arrangement in accordance with claim 1, characterised in that a plurality of tubes (38), in particular interconnected tubes, is provided between the circuit board (6, 14) carrying the transmitter and receiver elements (7, 15) and the front plate (10, 18) forming the diffractive /refractive optical elements (11, 19).

21. Optical arrangement in accordance with claim 20, characterised in that the tubes (38) are manufactured by the injection moulding method.

22. Optical arrangement in accordance with claim 20, characterised in that the tubes (38) are connected together in one piece.

23. Optical arrangement in accordance with claim 20, characterised in that the tubes (38) form an intermediate element (37), in particular a flexible intermediate element (37).

24. Optical arrangement in accordance with claim 23, characterised in that the intermediate element (37) is of flexible design substantially in the direction of the optical axes of the transmitter and receiver elements (7, 15) and/or in the direction substantially perpendicular to the optical axes of the transmitter and receiver elements (7, 15) and/or in any desired direction.

25. Optical arrangement in accordance with claim 23, characterised in that the intermediate element (37) comprises two units (39) separate in the longitudinal direction and is in particular plugged together from these units (39).

26. Optical arrangement in accordance with claim 25, characterised in that the units (39) are formed substantially with mirror-symmetry relative to the longitudinal axis of the intermediate element (37).

27. Optical arrangement in accordance with claim 20, characterised in that the number of tubes (38) is smaller than or the same as the number of the diffractive/refractive optical elements (11, 19).

28. Light grid, having at least one optical arrangement with transmitter elements (7) and also at least one optical arrangement with receiver elements (15) in accordance with claim 1.

29. Method of manufacturing a carrier element consisting of transparent material (29) and having a predetermined number of diffractive/refractive optical elements (11, 19), in particular for use in optical arrangements in accordance with claim 1 in which, in a first method step, a number of diffractive/refractive optical elements (11, 19) greater than the predetermined number is directly integrated into the transparent material (29) and is in particular pressed into or cast into the transparent material (29), and wherein in a further method step the carrier element with the predetermined number of diffractive/refractive optical elements (11, 19) is formed by cutting off a section of the transparent material (29) in which the predetermined number of diffractive/ refractive optical elements (11, 19) is formed.

30. Method in accordance with claim 29, characterised in that flexible plastic, in particular a flexible foil is used as the transparent material (29).

31. Method in accordance with claim 29, characterised in that a strip-like transparent material (29) is used.

32. Method in accordance with claim 31, characterised in that the strip-like transparent material (29) is rolled up prior to forming the diffractive/refractive optical elements (11, 19) on a first reel, and in that, for the formation of the diffractive/refractive optical elements, one end of the transparent material is unwound from the first reel (30) and passed to a device for forming diffractive/refractive optical elements (11, 19) in which the diffractive/refractive optical elements (11, 19) are integrated into the transparent material.

33. Method in accordance with claim 32, characterised in that the regions of the transparent material (29) into which the diffractive/refractive optical elements (11, 19) were integrated is wound up onto a second reel (32) and, after the transparent material (29) has been fully wound up onto the second reel (32), the section with the predetermined number of diffractive/refractive optical elements (11, 19) is again unwound from the second reel (32) and subsequently cut off.

34. Method of manufacturing a circuit board (6, 14) with a predetermined number of transmitter elements/receiver elements (7, 15), in particular for use in an optical arrangement in accordance with claim 1, wherein, in a first method step, circuit board material is equipped with a number of transmitter elements/receiver elements (7, 15) which is larger than the predetermined number and wherein, in a further method step, the circuit board (6, 14) with the predetermined number of transmitter elements/receiver elements (7, 15) is formed by cutting off a section of the circuit board material (34) which contains the predetermined number of transmitter elements/receiver elements (7, 15).

35. Method in accordance with claim 34, characterised in that flexible plastic, in particular a flexible foil is used as the circuit board material (34).

36. Method in accordance with claim 34, characterised in that a circuit board material (34) of strip-like design is used.

37. Method in accordance with claim 36, characterised in that the circuit board material (34) of strip-like design is wound onto a first reel (33) prior to equipping it with the transmitter elements/receiver elements (7, 15) and, for the equipping with the transmitter elements/receiver elements (7, 15) one end of the circuit board material (34) is unwound from the first reel (33) and passed to an equipping device (35) in which the circuit board material (34) is equipped with the transmitter elements/receiver elements (7, 15).

38. Method in accordance with claim 37, characterised in that the regions of the circuit board material (34) which were equipped with the transmitter elements/receiver elements (7, 15) are wound onto a second reel (36) and, after full winding of the circuit board material (34) onto the second reel (36), the section with the predetermined number of transmitter elements/receiver elements (7, 15) is in turn unwound from the second reel (36) and subsequently cut off.

39. Method of manufacturing a diaphragm plate (8, 16) with a predetermined number of diaphragm apertures (9, 17), in particular for use in an optical arrangement in accordance with claim 2, in which, in a first method step, a plurality of diaphragm apertures (9, 17) which is greater than the predetermined number is formed in the diaphragm plate material and, in a further method step, the diaphragm plate (8, 16) with the predetermined number of diaphragm apertures (9, 17) is formed by cutting off a section of the diaphragm plate material which contains the predetermined number of diaphragm openings (9, 17).

40. Method in accordance with claim 39, characterised in that a flexible plastic, in particular a flexible foil, is used as the diaphragm plate material.

41. Method in accordance with claim 39, characterised in that a diaphragm plate material of strip-like design is used.

42. Method in accordance with claim 41, characterised in that the diaphragm plate material of strip-like design is wound, prior to formation of the diaphragm openings (9, 17), onto a first reel and, for the formation of the diaphragm openings (9, 17), one end of the diaphragm plate material is unwound from the first reel and supplied to a device for forming diaphragm apertures, in particular to a punch device, in which the diaphragm apertures (9, 17) are formed in the diaphragm plate material.

43. Method in accordance with claim 42, characterised in that the regions of the diaphragm plate material in which the diaphragm apertures (9, 17) are formed, are wound onto a second reel and, after full winding up of the diaphragm plate material onto the second reel, the section with the predetermined number of diaphragm apertures (9, 17) is unwound again from the second reel and subsequently cut off.

* * * * *